United States Patent
Self et al.

(10) Patent No.: US 7,823,768 B2
(45) Date of Patent: Nov. 2, 2010

(54) SYSTEM AND METHOD OF CODE GENERATION AND AUTHENTICATION

(75) Inventors: Matthew Self, Emerald Hills, CA (US); Elliot Grant, Redwood City, CA (US)

(73) Assignee: YottaMark, Inc., Redwood City, CA (US)

( * ) Notice: Subject to any disclaimer, the term of this patent is extended or adjusted under 35 U.S.C. 154(b) by 861 days.

(21) Appl. No.: 11/619,747

(22) Filed: Jan. 4, 2007

(65) Prior Publication Data

US 2007/0175974 A1 Aug. 2, 2007

Related U.S. Application Data

(63) Continuation-in-part of application No. 11/347,424, filed on Feb. 2, 2006, now Pat. No. 7,614,546.

(51) Int. Cl.
*G06F 17/00* (2006.01)

(52) U.S. Cl. .................................................. 235/375

(58) Field of Classification Search ................ 235/375
See application file for complete search history.

(56) References Cited

U.S. PATENT DOCUMENTS

| 4,526,404 A | 7/1985 | Vazquez |
| 4,832,204 A | 5/1989 | Handy et al. |
| 5,343,529 A * | 8/1994 | Goldfine et al. ............... 705/75 |
| 5,360,628 A | 11/1994 | Butland |
| 5,478,990 A | 12/1995 | Montanari et al. |
| 5,486,686 A * | 1/1996 | Zdybel et al. ............... 235/375 |
| 5,569,317 A | 10/1996 | Sarada et al. |
| 5,592,561 A | 1/1997 | Moore |
| 5,611,948 A | 3/1997 | Hawkins |
| 5,768,384 A | 6/1998 | Berson |

(Continued)

FOREIGN PATENT DOCUMENTS

WO WO 03/007252 A1 1/2003

OTHER PUBLICATIONS

U.S. Appl. No. 12/143,016, Elliott Grant, Duo Codes for Product Authentication, filed Jun. 20, 2008.

(Continued)

*Primary Examiner*—Jamara A Franklin
(74) *Attorney, Agent, or Firm*—Peters Verny, LLP

(57) ABSTRACT

Systems and methods of code generation and authentication are disclosed here. One embodiment includes receiving a request for a batch of codes, each code being unique for a separate unit item, generating a batch of codes, each code being unique for a separate unit item, wherein a subsection of the code comprises a check value, and encrypting the code. In response to receiving a request to authenticate a code, decrypting the code to access a subsection of the code comprising a check value, comparing the check value to a value to authenticate the code. In one embodiment, the encrypting further comprises encrypting the code with a key, and including a key identifier as a subsection of the encrypted code; and decrypting the code further comprises using the key identifier included in the encrypted code to access the key to decrypt the code. Further more, in one embodiment, the batch of codes are provided to be marked on a plurality of products as at least one of a numeric representation, an alphanumeric representation, or a graphic symbol.

16 Claims, 9 Drawing Sheets

U.S. PATENT DOCUMENTS

| | | | |
|---|---|---|---|
| 5,895,073 | A | 4/1999 | Moore |
| 5,917,925 | A | 6/1999 | Moore |
| 6,005,960 | A | 12/1999 | Moore |
| 6,203,069 | B1 | 3/2001 | Outwater et al. |
| 6,211,789 | B1 | 4/2001 | Oldham et al. |
| 6,212,638 | B1 | 4/2001 | Lee et al. |
| 6,226,619 | B1 | 5/2001 | Halperin et al. |
| 6,231,435 | B1 | 5/2001 | Pilger |
| 6,246,778 | B1 | 6/2001 | Moore |
| 6,297,508 | B1 | 10/2001 | Barmore et al. |
| 6,329,920 | B1 | 12/2001 | Morrison et al. |
| 6,342,839 | B1 | 1/2002 | Curkendall et al. |
| 6,346,885 | B1 | 2/2002 | Curkendall |
| 6,361,079 | B1 | 3/2002 | Kirkman |
| 6,398,106 | B1 | 6/2002 | Ulvr et al. |
| 6,428,640 | B1 | 8/2002 | Stevens et al. |
| 6,442,276 | B1 | 8/2002 | Doljack |
| 6,456,729 | B1 | 9/2002 | Moore |
| 6,536,672 | B1 | 3/2003 | Outwater |
| 6,612,494 | B1 | 9/2003 | Outwater |
| 6,664,897 | B2 | 12/2003 | Pape et al. |
| 6,680,783 | B1 | 1/2004 | Pierce et al. |
| 6,766,324 | B2 | 7/2004 | Carlson et al. |
| 6,788,800 | B1 | 9/2004 | Carr et al. |
| 6,796,504 | B2 | 9/2004 | Robinson |
| 6,805,926 | B2 | 10/2004 | Cote et al. |
| 6,806,478 | B1 | 10/2004 | Hatfield |
| 6,808,574 | B1 | 10/2004 | Stevens et al. |
| 6,859,672 | B2 | 2/2005 | Roberts et al. |
| 6,995,675 | B2 | 2/2006 | Curkendall et al. |
| 7,013,286 | B1 | 3/2006 | Aggarwal et al. |
| 7,040,532 | B1* | 5/2006 | Taylor et al. ............... 235/375 |
| 7,207,481 | B2 | 4/2007 | Barenburg et al. |
| 7,211,163 | B2 | 5/2007 | Kennedy |
| 7,222,791 | B2* | 5/2007 | Heilper et al. ......... 235/462.01 |
| 7,261,235 | B2 | 8/2007 | Barenburg et al. |
| 7,283,630 | B1* | 10/2007 | Doljack ..................... 380/55 |
| 7,321,310 | B2 | 1/2008 | Curkendall et al. |
| 7,412,461 | B2 | 8/2008 | Sholl et al. |
| 7,519,825 | B2* | 4/2009 | Geoffrey ................... 713/181 |
| 2001/0056359 | A1 | 12/2001 | Abreu |
| 2002/0004767 | A1* | 1/2002 | Okamoto et al. ............. 705/28 |
| 2002/0158765 | A1 | 10/2002 | Pape et al. |
| 2002/0178363 | A1 | 11/2002 | Ambrogio et al. |
| 2003/0080191 | A1 | 5/2003 | Lubow et al. |
| 2003/0177025 | A1 | 9/2003 | Curkendall et al. |
| 2003/0177095 | A1 | 9/2003 | Zorab et al. |
| 2003/0221108 | A1* | 11/2003 | Rupp ...................... 713/176 |
| 2004/0200892 | A1 | 10/2004 | Curkendall et al. |
| 2005/0004682 | A1 | 1/2005 | Gaddis et al. |
| 2005/0097054 | A1 | 5/2005 | Dillon |
| 2005/0247778 | A1 | 11/2005 | Roberts |
| 2005/0251449 | A1 | 11/2005 | Pape et al. |
| 2006/0004907 | A1 | 1/2006 | Pape et al. |
| 2006/0100964 | A1 | 5/2006 | Wilde et al. |
| 2006/0111845 | A1 | 5/2006 | Forbis et al. |
| 2006/0161443 | A1 | 7/2006 | Rollins |
| 2006/0187048 | A1 | 8/2006 | Curkendall et al. |
| 2007/0051362 | A1 | 3/2007 | Sullivan et al. |
| 2007/0119954 | A1 | 5/2007 | Barenburg et al. |
| 2007/0119955 | A1 | 5/2007 | Barenburg et al. |
| 2007/0203724 | A1 | 8/2007 | Farmer et al. |
| 2007/0203818 | A1 | 8/2007 | Farmer et al. |
| 2008/0011843 | A1 | 1/2008 | Barenburg et al. |
| 2008/0030348 | A1 | 2/2008 | Pape et al. |
| 2008/0046263 | A1 | 2/2008 | Sager et al. |
| 2008/0178197 | A1 | 7/2008 | Pape et al. |
| 2008/0215484 | A1 | 9/2008 | Oldham et al. |
| 2009/0242631 | A1 | 10/2009 | Wishnatzki et al. |

OTHER PUBLICATIONS

U.S. Appl. No. 12/143,085, Elliott Grant, Duo Codes for Product Authentication, filed Jun. 20, 2008.
Examiner's Action of Jun. 3, 2008, U.S. Appl. No. 11/347,424.
Amendment A, filed Aug. 6, 2008, U.S. Appl. No. 11/347,424.
Examiner's Action of Dec. 26, 2008, U.S. Appl. No. 11/347,424.
Statement of the Substance of the Interview, filed Jan. 13, 2009, U.S. Appl. No. 11/347,424.
Examiner's Action of May 1, 2009, U.S. Appl. No. 11/347,424.
Amendment B, filed May 14, 2009, U.S. Appl. No. 11/347,424.
Statement of the Substance of the Interview, filed Jul. 1, 2009, U.S. Appl. No. 11/347,424.
Interview Summary of Jul. 2, 2009, U.S. Appl. No. 11/347,424.
Notice of Allowance of Sep. 18, 2009, including Examiner's Amendment, U.S. Appl. No. 11/347,424.
Examiner's Action of Dec. 7, 2009, U.S. Appl. No. 11/612,209.
Amendment A, filed Jan. 22, 2010, U.S. Appl. No. 11/612,209.
PCT/US06/03768 International Search Report, dated Jun. 12, 2008.
PCT/US08/75626 International Search Report and Written Opinion, dated Nov. 26, 2008.
U.S. Appl. No. 11/743,648 Non-Final Office Action, dated Aug. 17, 2010.

* cited by examiner

Alphanumeric Conversion
Table 1

| Character | Value |
|---|---|
| 0 (O, Q) | 0 |
| 1 (I) | 1 |
| 2 | 2 |
| 3 | 3 |
| 4 | 4 |
| 5 | 5 |
| 6 | 6 |
| 7 | 7 |
| 8 (B) | 8 |
| 9 | 9 |
| A | 10 |
| C | 11 |
| D | 12 |
| E | 13 |
| F | 14 |
| G | 15 |

| Character | Value |
|---|---|
| H | 16 |
| J | 17 |
| K | 18 |
| L | 19 |
| M | 20 |
| N | 21 |
| P | 22 |
| R | 23 |
| S | 24 |
| T | 25 |
| U | 26 |
| V | 27 |
| W | 28 |
| X | 29 |
| Y | 30 |
| Z | 31 |

602 ⟶ 1J22  3356
ACN5 H4LM

SYSTEM AND METHOD OF CODE GENERATION AND AUTHENTICATION

RELATED APPLICATIONS

This application is a continuation-in-part of U.S. patent application Ser. No. 11/347,424 "Method and System for Deterring Product Counterfeiting, Diversion, and Piracy" filed Feb. 2, 2006 now U.S. Pat. No. 7,614,546, which is incorporated herein by reference.

TECHNICAL FIELD

The present disclosure relates generally to a method and system for generating a code and authenticating the code for product tracking purposes.

BACKGROUND

Product quality and reliability has become increasingly crucial in the era of global proliferation of goods exchanges and sales. With increased globalization, products are distributed worldwide, and manufacturing may also be carried out globally due to resource variety and/or budgetary considerations. As such, management and supervision of product development and quality control has become a progressively difficult task.

For example, defective products may be manufactured due to operator negligence, and/or equipment malfunctions, etc. Depending on the nature of the product, the defect may cause malfunction (e.g., performance issues of electronics devices, scratched CDs, etc), or have more serious implications that endanger lives in cases such as a malfunctioning pacemaker, incorporation of toxic elements during food processing. In these situations, it may be important to identify the source of the problem in a timely fashion to prevent further distribution and manufacture of defected products. However, due to a diverse supply chain, and global manufacturing plants, identifying the problem source is frequently a time consuming and labor intensive task.

Additionally, advent of technology has encouraged and facilitated product counterfeiting. Product counterfeiting may encompass marketing impure jewelry products, brand-naming generic drugs/non-approved drugs, counterfeiting medicine, and/or brand-naming generic soda. Certain situations result in monetary loss whereas in some situations, lives may be at stake, such as a non-approved drug of unknown origin causing unexpected reactions.

Furthermore, different countries also have different export and import control regulations. Imports of certain products may be regulated and/or prohibited. To circumvent import/export controls and/or taxation issues, products may be disguised and packaged as an alternate product with more lenient regulations and/or lower taxes before shipment across foreign borders. This may significantly impact government tax revenues. The ability to track and monitor distribution of sensitive items (e.g., weapons, drugs, alcohol, medication, etc.) may also be inhibited.

SUMMARY OF THE DESCRIPTION

Systems and methods of code generation and authentication are described here. Some embodiments of the present invention are summarized in this section. One embodiment includes receiving a request for a batch of codes, each code being unique for a separate unit item, generating a batch of codes, each code being unique for a separate unit item, wherein a subsection of the code comprises a check value, and encrypting the code. In response to receiving a request to authenticate a code, decrypting the code to access a subsection of the code comprising a check value, comparing the check value to a value to authenticate the code. In one embodiment, the encrypting further comprises encrypting the code with a key, and including a key identifier as a subsection of the encrypted code; and decrypting the code further comprises using the key identifier included in the encrypted code to access the key to decrypt the code. Further more, in one embodiment, the batch of codes are provided to be marked on a plurality of products as at least one of a numeric representation, an alphanumeric representation, or a graphic symbol.

The present disclosure includes methods and apparatuses which perform these methods, including processing systems which perform these methods, and computer readable media which when executed on processing systems cause the systems to perform these methods.

Other features of the present invention will be apparent from the accompanying drawings and from the detailed description which follows.

BRIEF DESCRIPTION OF THE DRAWINGS

The disclosure is illustrated by way of example and not limitation in the figures of the accompanying drawings in which like references indicate similar elements.

DETAILED DESCRIPTION

Figure 1:
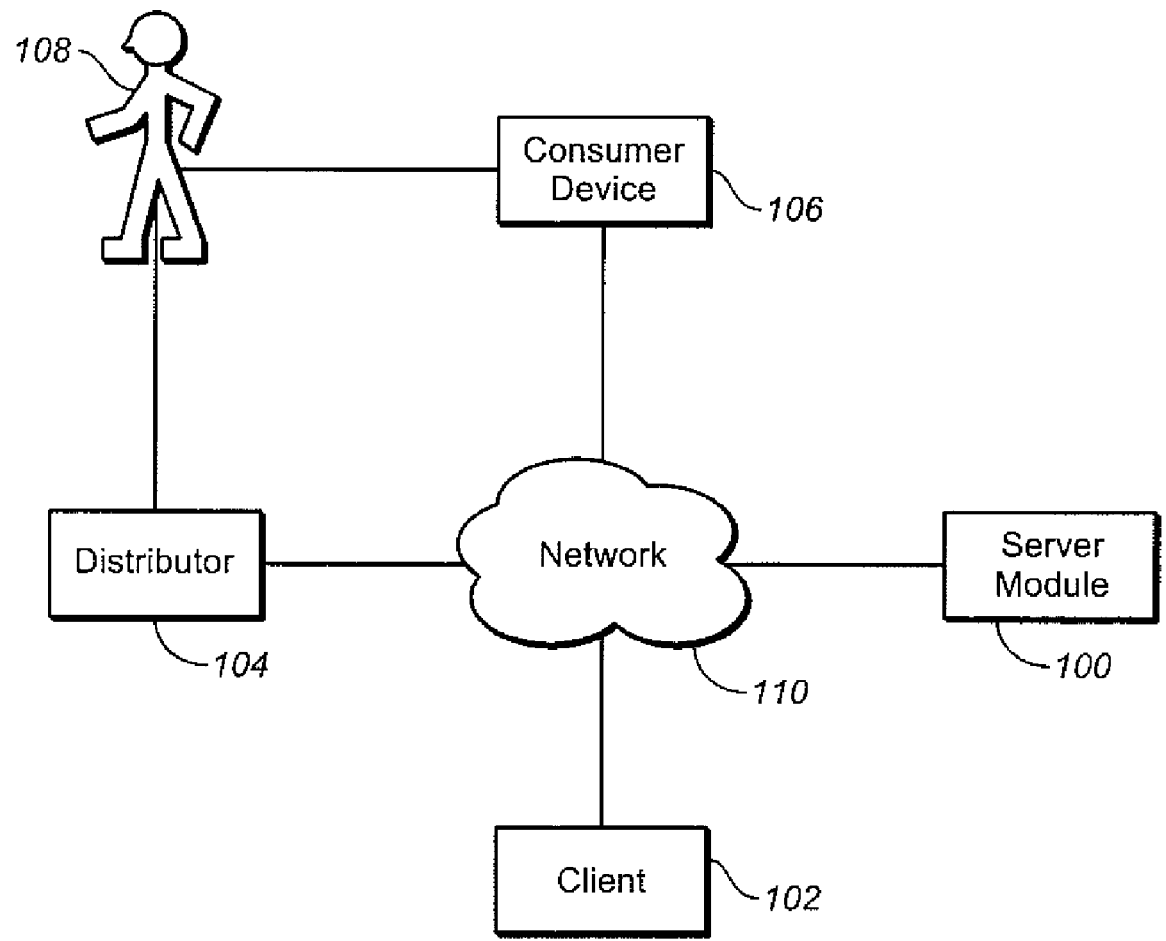
FIG. 1 illustrates an example of a consumer device and/or a client communicating with a server module to access code generation, authentication services, according to one embodiment.

At least some embodiments of the disclosure relate to a method and system of code generation and authentication.

The following description and drawings are illustrative and are not to be construed as limiting. Numerous specific details are described to provide a thorough understanding of the disclosure. However, in certain instances, well known or conventional details are not described in order to avoid obscuring the description. References to one or an embodiment in the present disclosure can be, but not necessarily are, references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Embodiments of the present disclosure include methods and systems for code generation and/or code authentication for product tracking purposes. In one embodiment, a method includes receiving a request for a batch of codes, each code being unique for a separate unit item, and where the request may be generated anywhere in a product supply chain by a client (e.g., a company, a manufacturing site of a company, a packaging center of a company, etc.). For example, the request may be generated during a manufacturing process to individually label a batch of items for tracking purposes; the request may also be generated during the packaging process prior to shipment. The batch of codes may be printed onto product labels upon receipt where each unit item has a different code. In one embodiment, the codes are printed with any type of printing system suitable for printing security codes on products, labels and/or product packaging. For example, the printing device used may be a high-speed industrial inkjet printer (with visible or invisible ink), a thermal transfer printer, and/or a laser marker, etc. In some embodiments, special invisible inks may be utilized to covertly mark products with invisible codes.

In one embodiment, each code generated is unique for a separate unit item (or package), and a subsection of the code includes a check value. The batch of codes may be generated based on data received from the client (e.g., the company). The data sent by the client may include time and date of manufacture, product code (e.g., UPC code), manufacturing plant, a product description, a package size or quantity, a packaging image, a work order, a lot number, an expiration date, operator name, and/or production line, etc. In one embodiment, a portion of the code may be a check value that is validated during a decryption process to determine authenticity of the product through comparing the check value to a value (e.g., a constant value for a batch) to authenticate the code.

According to one embodiment, in response to receiving a request to authenticate a code, the code is decrypted using a key. The key is identified by an identifier appended to the code. Once decrypted, a check value is identified from the code after decryption. The check value is then compared to a constant (e.g., predetermined) value to authenticate the code.

In another embodiment the product code does not include a key identifier to identify the encryption key. Rather the same encryption key is used to generate the product codes and the product codes can be decrypted with the same encryption key. Alternatively, a set of keys may be used to generate a set of codes, without keeping track of the encryption key used to generate each code. Rather than using a key identifier to determine the key used, each key of the set of keys is used during the authentication process to decrypt the code received in an authentication request until the expected check value can be extracted from one of decoded results. If none of the keys can decrypt the code to yield an expected check value, the product code is determined to be inauthentic.

For example, the request to authenticate a code may be generated by a consumer during a shopping session, by a clinician when a medical product is to be used, by a distributor prior to product shelving, and/or the consumer when the product is to be used/consumed. In one embodiment, the check value may be compared to a predetermined value to authenticate the code associated with a particular product. If code authentication fails, the client (e.g. the company) can be notified such that appropriate action (e.g., product recall, product tracing, etc.) can be taken.

FIG. 1 illustrates an example of a consumer device 106 and/or a client 102 communicating with a server module 100 to access code generation and authentication services through a network 110, according to one embodiment.

The server module 100 may be operated by an entity that offers coding generation and authentication services to one or more clients 102. For example, the client 102 having multiple manufacturing and/or packaging sites may be serviced by a server module 100 at each site, as needed. Alternatively, the server module 100 may service a variety of clients 102 associated with different companies having similar or different products. The server module 100 may also service various sites of the same company.

In one embodiment, the server module 100 maintains client information such as product lines, manufacturing sites, and/or dates of production associated with a particular batch request to be associated with management of client specific encryption/decryption keys. In one embodiment, each client 102 has a unique key. In alternate embodiments, unique keys may be assigned to each product line for the client 102, a new key is generated periodically for each client 102, or a new key is generated based on frequency of usage by the client 102. In addition, a different key may also be associated with products manufactured from a different manufacturing site of the client 102. In one embodiment, a set of unique codes having a common check value as a section of the code is generated and the set of unique codes can be authenticated by comparing the check value of the code to a constant value for the codes of a batch.

The network 110, over which the client 102, the consumer device 106 and the server module 100 communicate may be an open network, such as the internet, or a private network, such as an intranet. In one embodiment, communications to and from the server module achieved by a means of secure communications protocol, such as secure sockets layer (SSL), or transport layer security (TLS).

The client 102 may be any of the various facilities of an organization involved in the process of delivering a product to the marketplace. Based on specific business processes and product delivery procedures of the particular organization, the client 102 may be integrated where suitable in the production line.

For example, the client 102 may be employed during manufacturing, prototyping, packaging, and/or distribution.

The client 102 may also be employed at a combination of facilities as necessary and communicating a request to the server module 100 for a set of codes to be placed on the product. In one embodiment, information regarding the product and/or the company itself may be sent to the server module 100 along with the request for codes to be encoded in the code such that information about the product can be revealed to a relevant party (e.g., a consumer or a distribution center, a customs officer, etc.) when the code is decoded to be authenticated.

Figure 8:
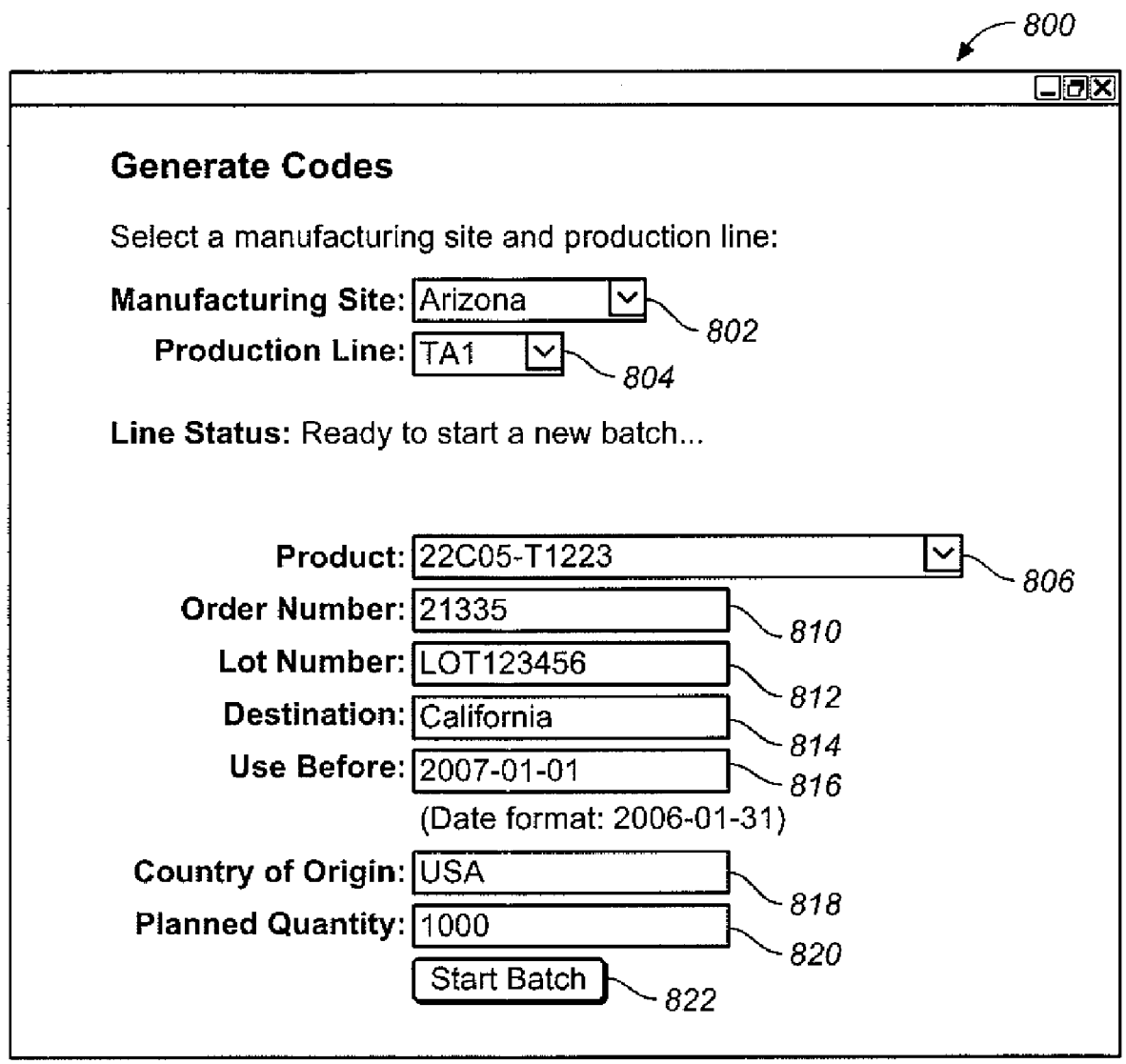
FIG. 8 illustrates a screen shot showing one embodiment of a web interface for entering data that identifies a batch of codes.

For example, FIG. 8 illustrates a screen shot 800 showing one embodiment of a web interface for entering data that identifies a batch of codes. In one embodiment, the data entry fields include a manufacturing site drop down box 802, a production line drop down box 804, a product selection drop down field 806, an order number field 810, a lot number field 812, a destination field 814, an expiry date field 816, a country of origin field 818, and a field to indicate planned quantity of codes to be generated 820. The batch information can then be submitted to the server module 100 when the 'start batch' button 822 is activated for code generation by the server module 100. Less than all of these features could be included, or alternative features could be included.

Batch information can be submitted through a web interface 800 to the server module 100 which generates a set of codes based on the batch information and returns the set of codes to the client 102. The set of codes can also be printed directly on products. In one embodiment, code generation capabilities reside on the client 102 and the web interface 800 is utilized to generate a batch of codes at the client 102 site with an encryption key received from the server module 100 and stored at the client 102 site.

Figure 9:
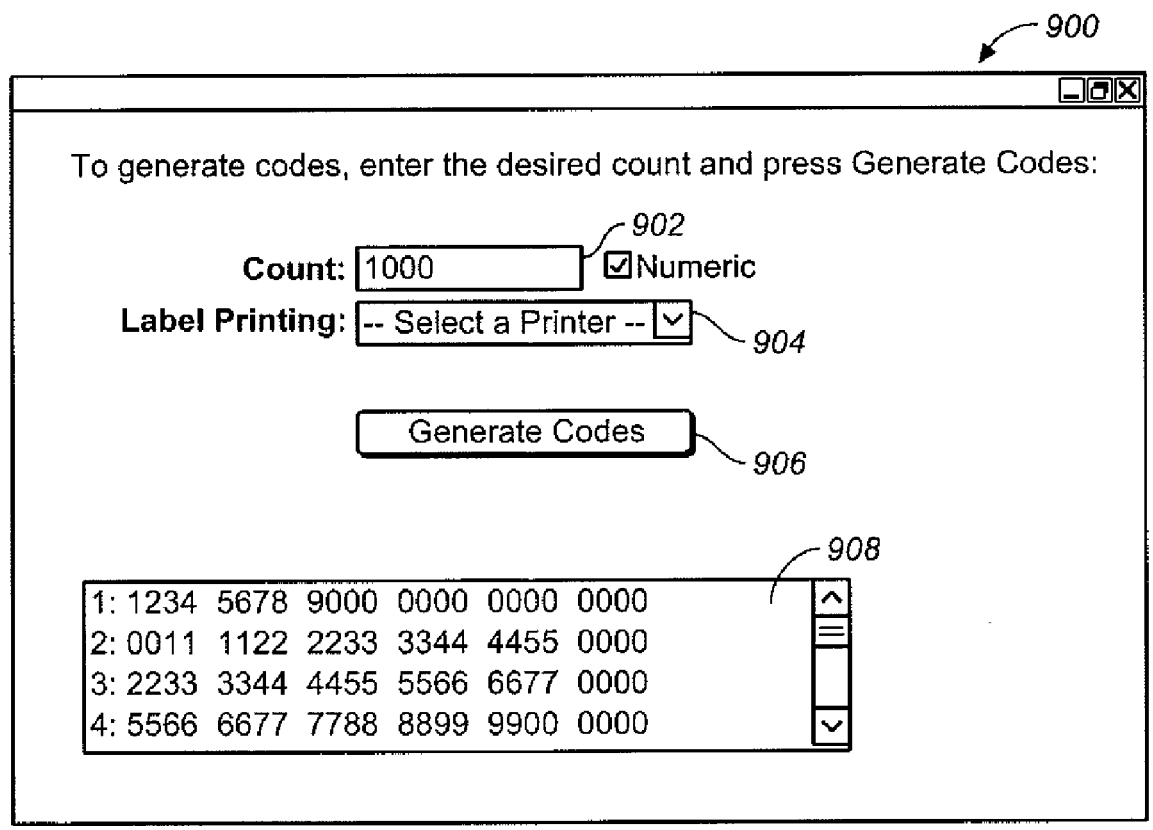
FIG. 9 illustrates a screen shot showing one embodiment of a web interface for requesting generation of a set of codes based on the batch information that was entered in the web interface of the screenshot of FIG. 8.

Furthermore, FIG. 9 illustrates a screen shot 900 showing one embodiment of a web interface for requesting generation of a set of codes based on the batch information that was entered in the web interface of the screenshot of FIG. 8, according to one embodiment. For example, the number of codes to be generated can be entered in the count field 902, and a printer can be selected in the printer field 904 to be used to print the set of codes on products. In one embodiment, when the generate codes button 906 is selected, a set of codes for the respective batch is generated by the server module 100 and displayed in the display box 908. The client 102 can receive the generated codes on the screen as shown. In one embodiment, the codes can be directly sent to a marking system to be placed on products. In one embodiment, the codes are generated at the client 102 site with an encryption key assigned by the server module 100.

The consumer device 106 can be any device having networking capabilities (e.g., mobile phone, PDA, notebook, desktop computer, etc.) able to send a code that is to be authenticated through the network 110 to the server module 100. For example, the consumer device 106 may be operated by a store manager, a supply manager of a medical clinic, a consumer at a shop, a user of a product to determine authenticity of the code corresponding to a particular product to verify product origin and to detect counterfeits. The code may be captured by the consumer device 106 in various methods including keyed entry from a keyboard, a telephone keypad, a (digital) camera, and/or a barcode reader and sent to the server module 100 for validation. In one embodiment, the code may be sent via email, text messaging, telephonic capabilities of the consumer device 106 to the server module 100 for authentication. In another embodiment, the code may be authenticated via a webpage access of data maintained by the server module 100 to view information associated with the product having the particular code.

Figure 10:
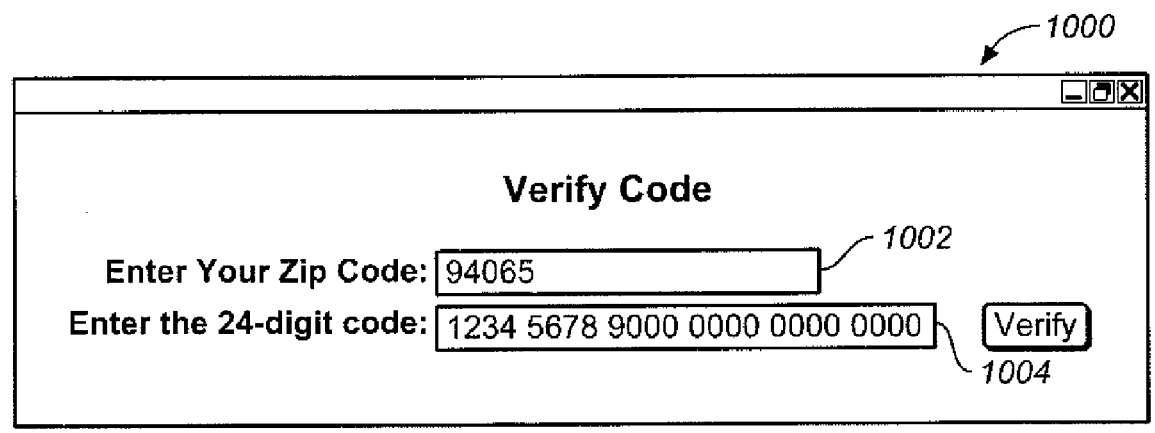
FIG. 10 illustrates a screen shot showing one embodiment of a web interface to verify authenticity of a code.

For example, FIG. 10 illustrates a screen shot 1000 showing one embodiment of a web interface to verify authenticity of a code. In one embodiment, the zip code of a location of authentication can be entered in the zip code field 1002 and the product code can be entered in the code field 1004. Once the verify button is activated, the information entered can be used to locate information associated with the code entered in the code field 1004 and authenticity of the code is determined by the server module 100. In one embodiment, the zip code of the location of authentication is used by the server module 100 to track usage of generated codes to detect duplication and to track destination of products. In addition to communicating authentication results to the consumer device 106, alternate information revealed during the decryption process, such as product information, expiration date, manufacturing location, may also be communicated to the consumer device 106 and displayed accordingly.

Figure 11:
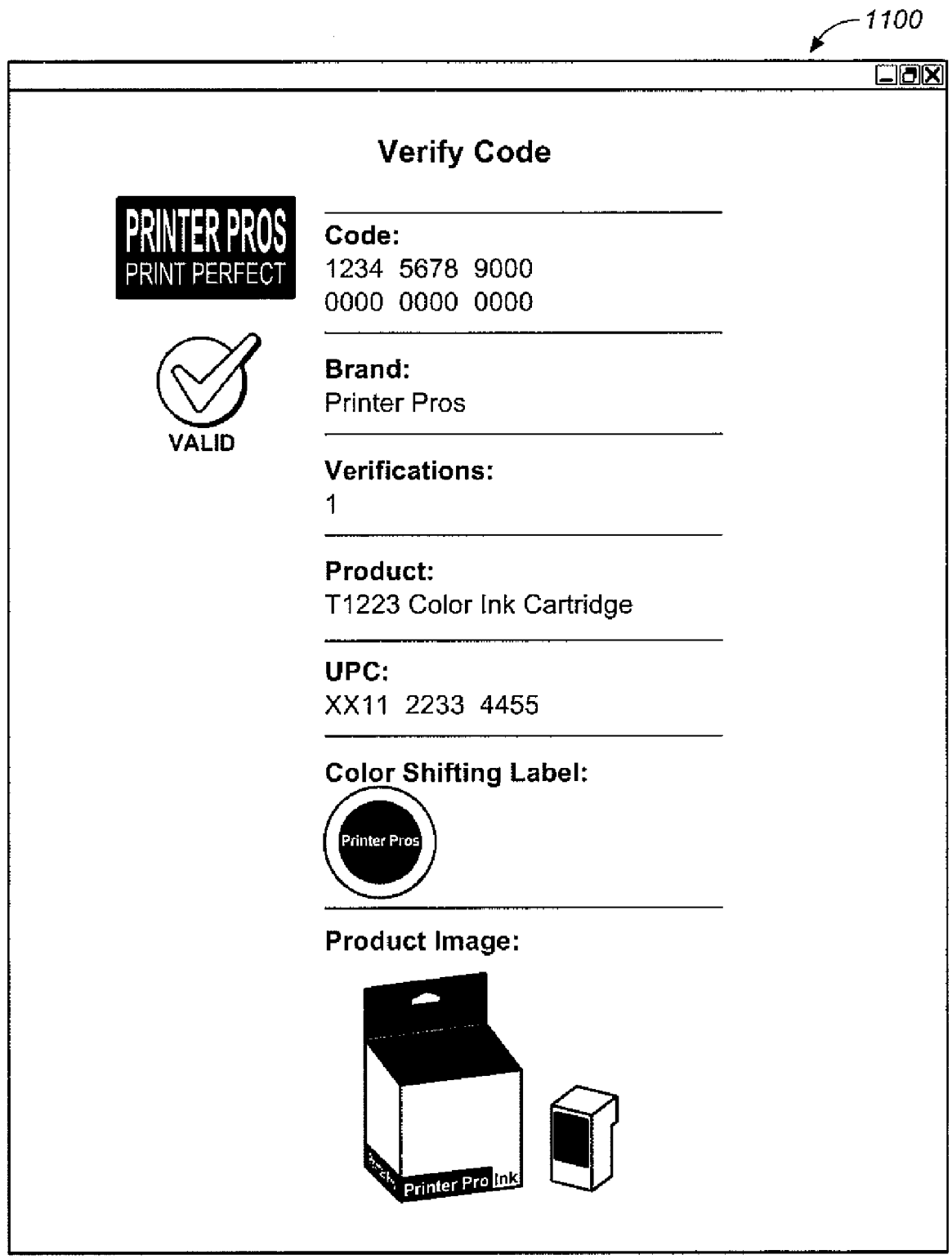
FIG. 11 illustrates a screen shot showing one embodiment of a web interface having the results from verifying authenticity of the code entered in the code field of FIG. 10.

For example, FIG. 11 illustrates a screen shot 1100 showing one embodiment of a web interface having the results from verifying authenticity of the code entered in the code field of FIG. 10. In this example, the product code was determined to be valid as indicated by a check mark icon labeled 'valid'. Furthermore, product information including the brand, type of product, UPC code is also determined and displayed on the verification screen. In one embodiment, a product image is displayed. In another embodiment, the number of times this code has been verified is reported to detect potential duplicate codes. Also included is an image of a color shifting label, which is a secondary security feature of the product.

Figure 2A:
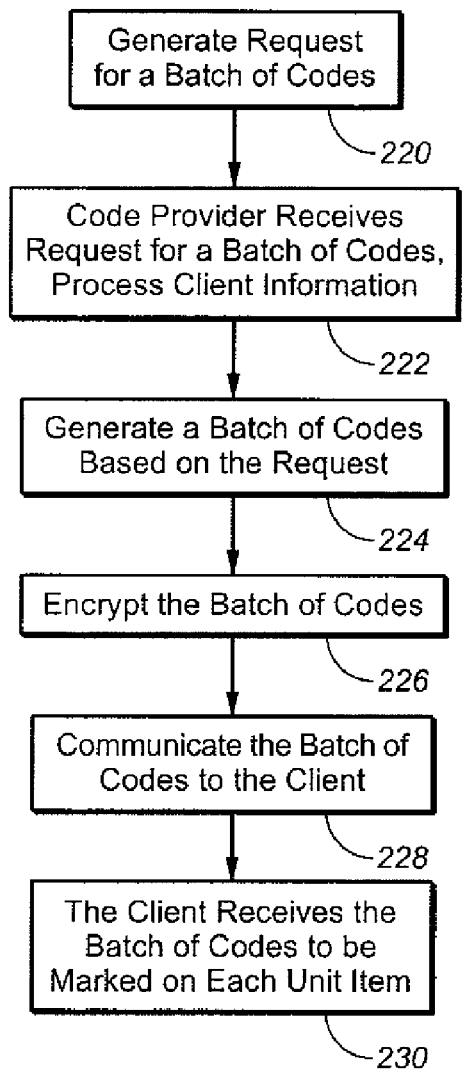
FIG. 2A is a flow chart describing an overview of an example process of code request, according to one embodiment.

FIG. 2A is a flow chart describing an overview of an example process of code request, according to one embodiment.

In operation 220, a request for a batch of codes is generated. In one embodiment, the request may also include relevant product information and/or client information. In operation 222, the code provider receives the request for a batch of codes and processes the client information, in one embodiment. In operation 224, the batch of codes is generated based on the request. In one embodiment, the request includes client information and/or relevant product information. In operation 226, the batch of codes is encrypted. In operation 228, the batch of codes is communicated to the requesting client. In operation 230, the client receives the batch of codes to be printed on each unit item.

Figure 2B:
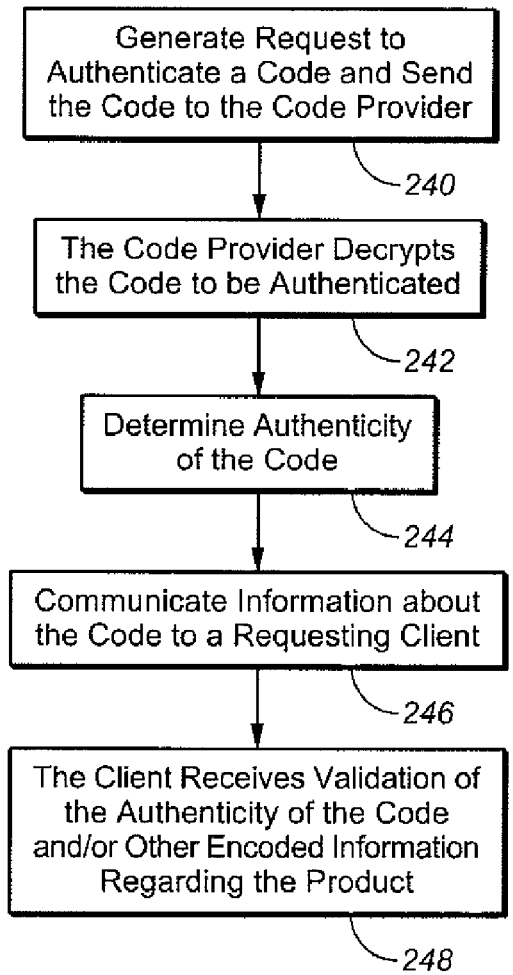
FIG. 2B is a flow chart describing an overview of an example process of code authentication request, according to one embodiment.

FIG. 2B is a flow chart describing an overview of an example process of code authentication request, according to one embodiment.

In operation 240, a request to authenticate a code is generated. In one embodiment, the code is sent to the code provider. In operation 242, the code to be authenticated is decrypted (by the code provider). In alternate embodiments, the decryption key is provided to the associated client and the decryption is performed by the client and the resulting decrypted value is sent back to the code provider, or an alternate authorized code authentication organization.

In one embodiment, the code authentication is performed by the code provider. In alternate embodiments, the code authentication is provided by an organization authorized by the code provider. The expected value is provided to the authorized organization to perform code authentication after decryption of the code. In operation 244, authenticity of the code is determined. In operation 246, the information about the code can be communicated to the requesting client. In operation 248, the client receives validation of the authenticity of the code and/or any other encoded information regarding the item.

Figure 3:
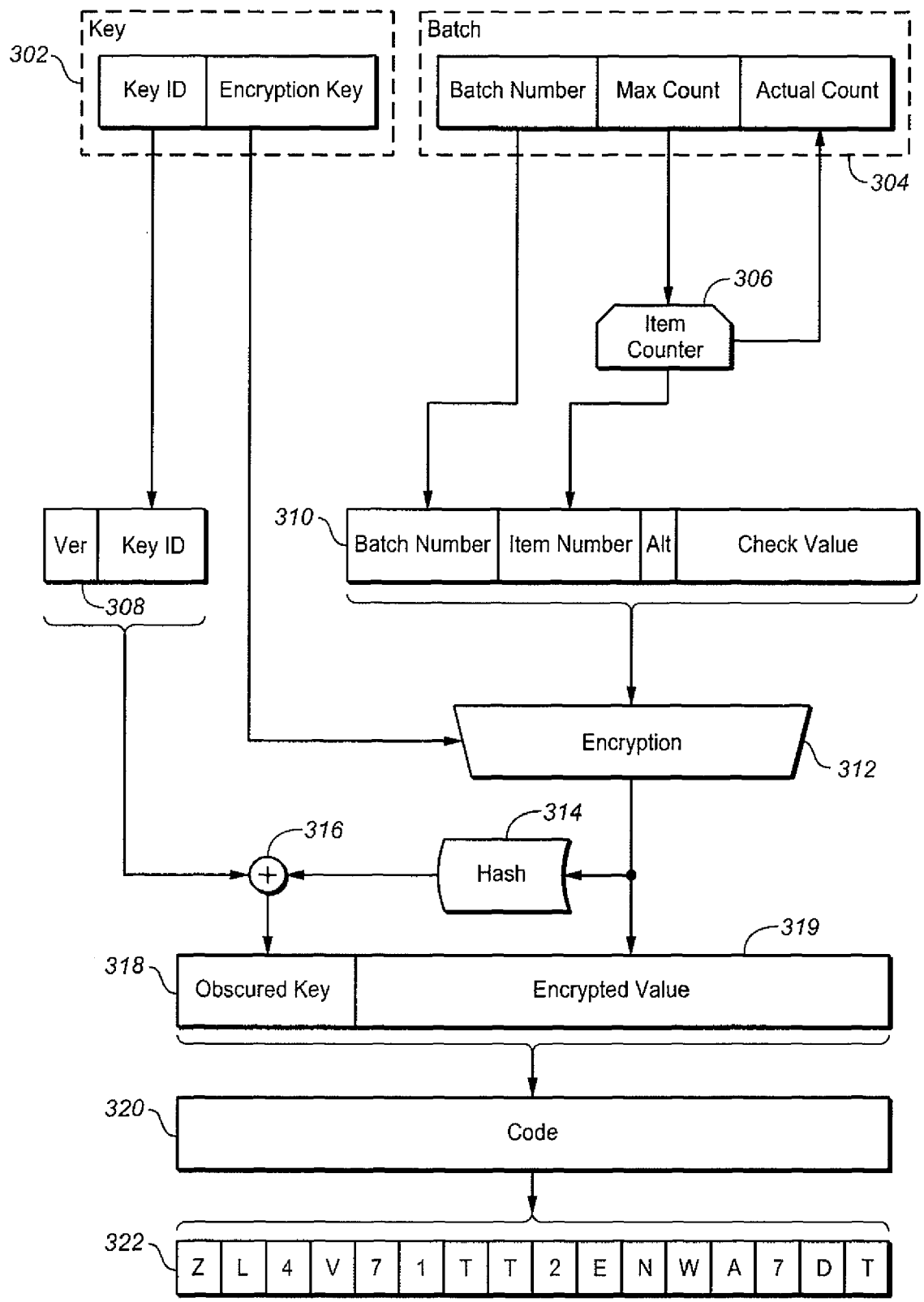
FIG. 3 is a block diagram of a code during a process of code generation and encryption, according to one embodiment.

FIG. 3 is a block diagram illustrating a process 300 of code generation and encryption, according to one embodiment.

When a request for a batch of codes is received, key information 302 and batch information 304 can be generated based on the client request. If the client is new, new key information and new batch information may be created based on coding needs of the new client. If the request is made by an existing client, existing key information 302 and batch information 304 may be retrieved and adjusted based on specific needs of the client (e.g., specific product line, specific manufacturing lot, specific version of an existing product, etc.).

In one embodiment, the key information includes a key-ID that identifies an encryption key and each client has a unique encryption key. In one embodiment, the key-ID is not maintained confidential since only the entity providing code generation services (e.g., server module 100) has access to the database linking the key-IDs to corresponding encryption keys.

In another embodiment, the same encryption key is used for each client. As such, the key information does not need to include the key-ID to identify an encryption key for a client since one encryption key is used for every client, Additionally, the batch numbers used for each client may be different (e.g., batches 1-5 for client A, and batches 10-15 for client B) so as to prevent same codes being generated for different clients.

In another embodiment, a predetermined number of encryption keys are used for a set of clients. The predetermined number of encryption keys used may be smaller than the number of clients. Rather than using a key-ID to identify an encryption key used, upon a request to authenticate a code, each of the encryption keys is used in an attempt to decode the code. If none of the decrypted values decrypted from each of the encryption keys yield the expected check value, then the code can be determined to be inauthentic. The decryption stops when one of the encryption codes is able decrypt a code to yield the expected check value or when the all the encryption codes have been used.

In one embodiment, the batch information 304 may include a batch number, a maximum count of items, and an actual count of codes generated. The batch number and maximum count may be based on information sent by the client regarding their specific coding needs. The coding needs may be different for each product, each manufacturing site, each production date, etc. For example, a different batch number may be assigned for the same product but manufactured on different dates. The maximum count may be specified during the request based on the number of items that need coding. In one embodiment, the item counter 306 sequentially generates an item number for each unit item and the number of actual codes generated (which may be less than the maximum count) is stored into the batch information 304 as the actual count.

In one embodiment, a series of identifiers 310 are combined where the series of identifiers include the batch number, the item number, an alternative value, and a check value. The check value is typically a known value that is predetermined and constant relative to a batch. In one embodiment, the series of identifiers 310 is encrypted using an encryption algorithm (e.g., triple-key DES encryption) with the encryption key stored as the key information 302. The encrypted value is shown as 319. In one embodiment, the encrypting includes encrypting with multiple keys where the key includes multiple keys.

In another embodiment, to be able to authenticate the code, information about the key-ID is included in the code. For example, information about the key-ID may be included in the code using at least a portion of the encrypted code with the key-ID to generate an obscured key-ID to be included in the code. Using the at least a portion of the encrypted code may include computing a hash of the at least a portion of the encrypted code. In one embodiment, an obscured key-ID can be generated by performing an operation 316 (e.g., a boolean operation, an arithmetic operation and/or a binary operation, etc.) between the key-ID and a hash (e.g., 16 bit hash) of the encrypted value 319.

The obscured key-ID can then be combined with the encrypted value 319 to form a code 320. In one embodiment, the code 320 has 80 bits where 16 bits include information about the key-ID and 64 bits include the encrypted value 319. The code 320 may be separated into smaller blocks (e.g., nibbles of 5 bits) and each block is converted into an alphanumeric character for readability. In one embodiment, each nibble of 5 bits is converted to numbers or digits, such as the alphanumeric representation 322 based on a mapping process illustrated in Table 1 of FIG. 5.

Figure 4:
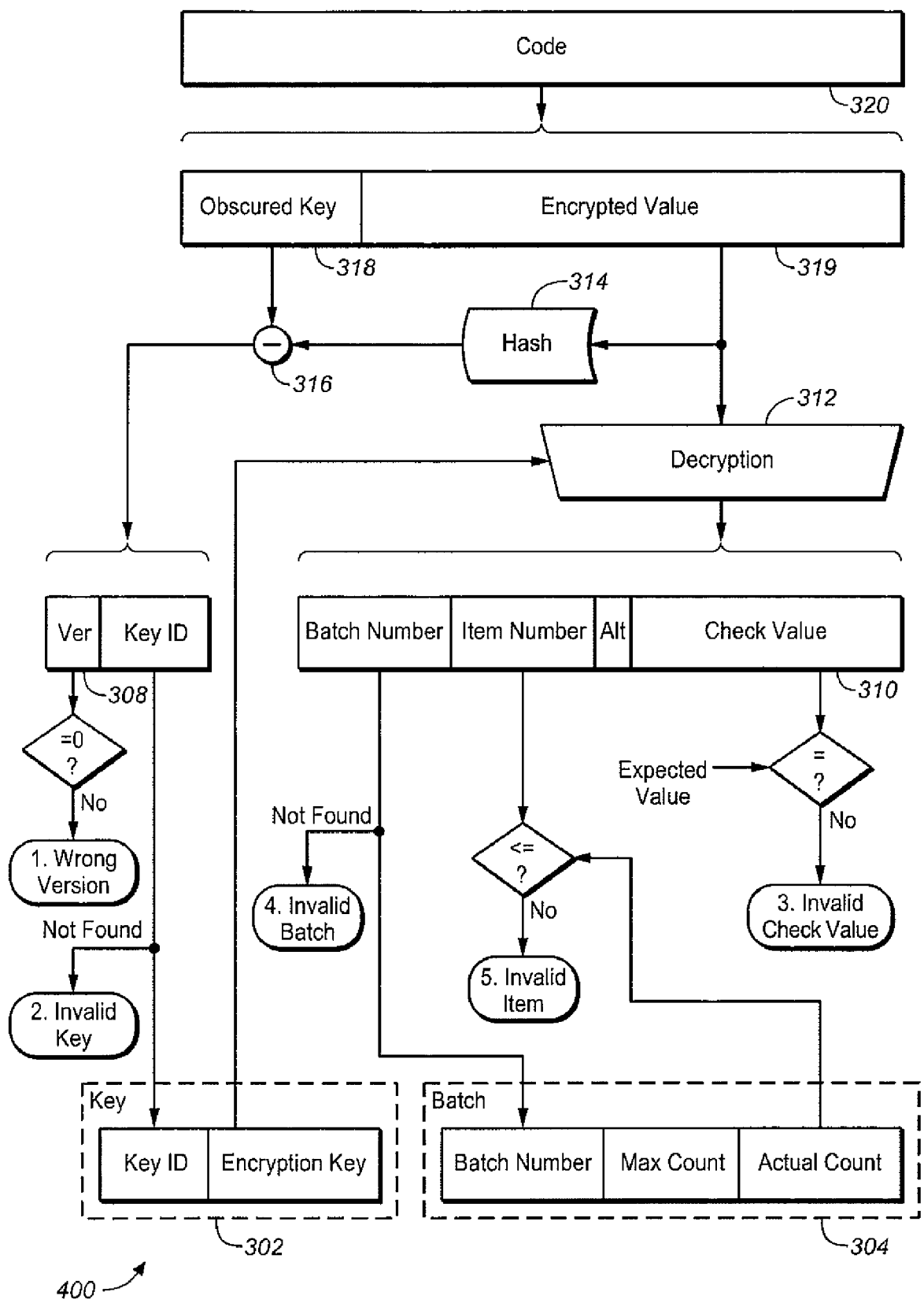
FIG. 4 is a block diagram of a code during a process of code decryption and authentication, according to one embodiment.

FIG. 4 is a block diagram illustrating a process 400 of code verification, according to one embodiment.

Figures 5, 6A, 6B:
FIG. 5 is an example conversion table for mapping between encrypted codes and a corresponding alphanumeric representation, according to one embodiment.
FIG. 6A illustrates an example of an alphanumeric representation of an encrypted code, according to one embodiment.
FIG. 6B illustrates an example of an alphanumeric representation of an encrypted code encoded as a graphic symbol, according to one embodiment.

When a code verification request is received, the alphanumeric representation of the code is first converted to its corresponding binary representation 320 based on a mapping process illustrated in Table 1 of FIG. 5. Depending on how the alphanumeric representation was printed on a unit item, space characters and/or dashes in the alphanumeric representation may be removed prior to the conversion. In one embodiment, if the binary representation 320 converted from the alphanumeric representation 322 includes values that are not present in Table 1 of FIG. 5, the code is determined to be invalid. In one embodiment, if the number of characters of the alphanumeric representation received in the request is different from the expected number of characters, the code is determined to be invalid.

If all received characters are valid and the expected number of codes were received, the obscured key-ID and version indicator can be un-obscured through performing the function 316 (e.g., boolean, arithmetic, and/or binary, etc.) on the obscured value with the bash 314 of the encrypted value. In one embodiment, the recovered value 308 includes a version indicator followed by the key-ID. In one embodiment, the obscured value 318 is the first 16 bits of the code 320 and the encrypted value is the latter 64 bits 319 of the code 320.

After the key-ID and the version indicator have been identified, the encryption key associated with the key-ID can be identified in a database (e.g., database 732 of the server module 100) of the coding service provider. In one embodiment, if a corresponding encryption key cannot be identified, the code is determined to be invalid. Since the key-ID was assigned through the coding service provider to clients, the coding service provider should have a record of key-IDs extracted from valid codes.

In one embodiment, if the encryption key corresponding to the key-ID is identified, the encrypted value 319 (e.g., the latter 64 bits of the code 320) is decrypted using the encryption key of the key information 302. In one embodiment, a check value can be extracted from the decrypted block 312 and compared to the expected value of the check value. If the extracted check value does not match the expected value, the code is determined to be invalid.

In one embodiment, a key-ID is not included in the code to identify an encryption key for the code. Rather, the same encryption key is used for each client. In another embodiment, a set of encryption keys is used. Rather than using a key-ID to identify the encryption key used to encrypt a particular code, each of the set of encryption keys is used to attempt to decrypt a code until the expected check value is extracted from the code. If none of the encryption keys can decrypt the code to yield an expected check value, the code can be determined to be inauthentic.

In addition, the batch number can also be extracted from the decrypted block 310 to locate batch information 304 that is associated with a particular product, manufacture lot, packaging site, etc. of the client. In one embodiment, if the batch number cannot be identified from the decrypted block 310, the code is determined to be invalid. Furthermore, the item number can also be extracted from the decrypted block 310. Since the batch information 304 includes a count of the number of codes generated for a particular batch of items, the code is also determined to be invalid if the item number exceeds the actual item count indicating tamper of the code production process to generate more codes than authorized.

FIG. 5 is an example conversion table for mapping encrypted codes into an alphanumeric representation, according to one embodiment.

In one embodiment, the final security code of binary representation may be divided into smaller sized blocks (e.g., 16 of 5 bit nibbles) where each block is converted to an alphanumeric character to enhance readability and/or to minimize space required to print a security code on a product packaging. In one embodiment, the conversion module 746 of the server module 100 of FIG. 2 reference the conversion table stored in the database 732 to perform the alphanumeric conversion. In one embodiment, each of the 5-bit nibbles is converted to one of 32 alphanumeric characters shown in Table 1 including ten digits and 22 upper case ASCII letters. In on embodiment, the letters O, Q, B, and I are not used due to potential confusion with the digits 0, 1, and 8. During verification, the conversion module 746 may reference Table 1 to map the alphanumeric representation of a security code received from a client back to the binary representation.

FIG. 6A illustrates an example of an alphanumeric representation of a security code, according to one embodiment. In one embodiment, the code is a string of sixteen alphanumeric characters consisting of numbers and letters, such as the code 602. By utilizing different combinations of sixteen alphanumeric characters, more than a billion ($10^{24}$) unique codes may be generated. However, it will be appreciated by one skilled in the art that alternative embodiments of the invention may use a code that is more or less than sixteen characters in length, and may use a code that makes use of the entire set of ASCII characters.

FIG. 6B illustrates an example of an alphanumeric representation of a code 604 encoded as a graphic symbol, according to one embodiment. In particular, the code 604 is a special machine readable graphic symbol known as a datamatrix. A datamatrix is a two-dimensional matrix barcode consisting of black and white square modules arranged in either a square or rectangular pattern. Similar to a traditional barcode, a datamatrix can be read by a machine, such as a matrix barcode reader. Encoding an alphanumeric representation of the security code in a graphic symbol, such as the datamatrix 604, provides several advantages. First, error correction and redundancy are built-in to the datamatrix 604. Consequently, a code represented as a datamatrix can still be read if it becomes partially damaged. Another advantage is the small footprint, or size, of the datamatrix. A datamatrix can encode as many as 50 characters in a three by three millimeter square, which can be discretely positioned on a product, a label, or product packaging. Finally, the datamatrix can be quickly and easily read by a machine.

Of course, it will be appreciated by those skilled in the art that in various alternative embodiments, codes may be encoded with other graphic symbologies, for example, such as barcode fonts consistent with the PDF417 or QR Code standards. In one embodiment, both versions of the code 602 and 604 may be included on the product, label, or product packaging. For example, the alphanumeric representation of the code 602 and the graphic symbol representation 604 may appear together on the product, label or product packaging. This provides a wide range of possible methods and mechanisms for reading and communicating the code for authentication. In one embodiment, when extra security is required, the codes may be applied or printed to the product, label, or product packaging in a covert manner, such that a consumer is not aware of the existence of the security code.

For example, the security codes may be applied to the products, labels or product packaging with a special invisible ink or other chemical-based application making the security code invisible to a consumer. According to the type of invisible ink or chemical used to apply the security code, reading the security code may require the application of heat, ultraviolet light, or a chemical. This approach may be utilized when someone in the supply or distribution chain other than the consumer is likely to be authenticating the product. For example, a covert security code may be provided for the purpose of authenticating products by customs officials.

Figure 7A:
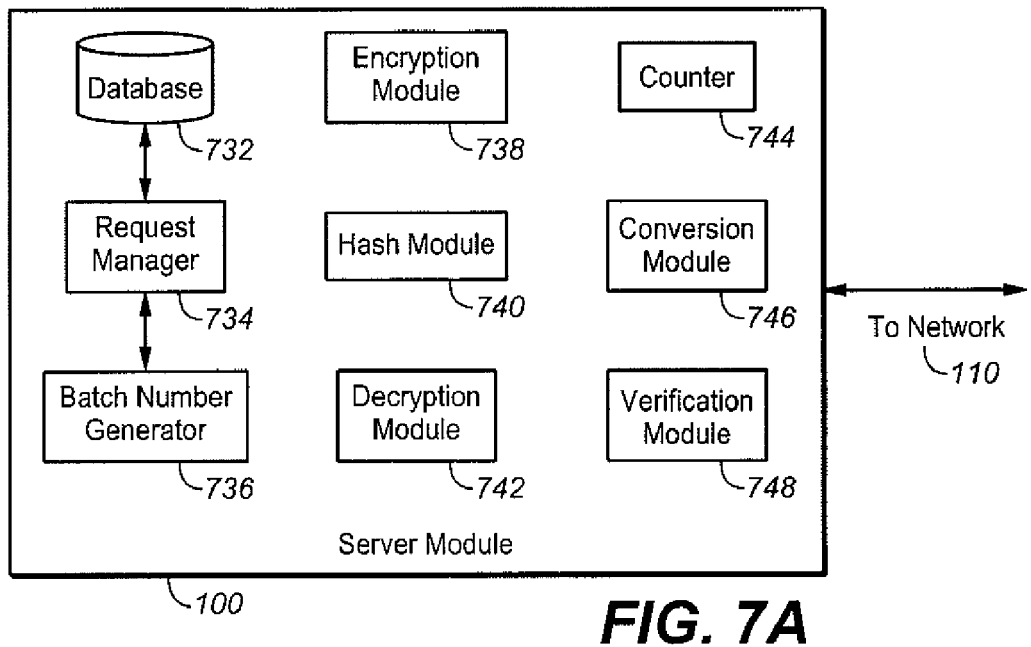
FIG. 7A is an exploded view of a server module, according to one embodiment.

FIG. 7A is an exploded view of a server module 100, according to one embodiment. The server module may include a database 732, a request manager 734, a batch number generator 736, an encryption module 738, a hash module 740, a decryption module 742, a counter 744, a conversion module 746, and/or a verification module 748. In alternate embodiments, additional modules may be included, or less modules, or some modules on separate systems.

In one embodiment, the server module 100 receives a request for a batch of codes, with each code to be unique for a separate unit item. In one embodiment, the request manager 734 may process client requests for code generation by initially assigning a key-ID for a new client or identifying a key-ID that has been previously assigned to an existing client in the database 732. In one embodiment, the key-ID is an identifier to an encryption key (e.g., a triple DES encryption key) that is used to encrypt the batch of codes. The key-ID may be unique for a particular client, a specific customer, a manufacturing plant, and/or a production line. The key-ID may also be updated periodically, or after a predetermined number of usages. In one embodiment, the database 732 maintains information about each key-ID of the client (customer) along with its associated encryption key.

In alternate embodiments, the key-ID is associated with each product of a client. The update frequency of the key-ID can also be maintained in the database 732. It can also be envisioned that in some embodiments, a key-ID is not used to identify the encryption key for a particular client. The same encryption key may be used for each client.

The request manger 734 may communicate client information (e.g., product information including product name, lot number, production date, and/or line operator etc.) to the batch number generator 736. In one embodiment, the batch number corresponds to a batch of products that are produced in a predetermined unit of time, or a predetermined location. For example, all toothpaste produced by Toothpaste Factory between 8 AM-11 AM may have one batch number and all toothpaste produced by Toothpaste Factory between 11 AM-1 PM may have another batch number. Additionally, toothpaste produced by Toothpaste Factory between 8 AM-11 AM at an alternate manufacturing site may yet have a different batch number. In one embodiment, each key-ID corresponds to a separate set of batch numbers.

For example, all Toothpaste Factory toothpaste may have one key-ID with different batch numbers dependent on time and place of manufacture. Alternatively, all Toothpaste Factory toothpaste manufactured at location A may have one key-ID and have different batch numbers depending on time of manufacture, and all Toothpaste Factory toothpaste manufactured at location B may have different batch number dependent on time of manufacture. In one embodiment, the database 732 retains information about each client and their associated batch number. The criterion used for batch number assignment (e.g., location based, time based, or a combination thereof, etc.) may also be stored in the database 732.

In one embodiment, a different batch number is used for each client if one encryption key is used for every client to avoid duplicate codes being generated.

In one embodiment, an item number is a unique number assigned to each item of a particular batch of items having the same batch number. An item typically corresponds to a single product or a single package. In one embodiment, the item numbers may be sequential having increments of one. In alternate embodiments, the item numbers may be incremented or decremented in other units. In one embodiment, each batch number has a separate set of item numbers. Since information is retained about the batch number assignments in the database, the server module 100 may not retain item numbers, according to one embodiment.

In an alternate embodiment, an additional value (e.g., an alternate value) is used to associate multiple codes with one unit to avoid codes that contain potentially offensive or inappropriate words. In one embodiment, when a code is verified, the alternate value is ignored during the authentication process. In other words, codes having the same key-ID, batch number, and item number identify a same item even though they may have different alternate values.

In one embodiment, the counter 744 generates item numbers for a set of items with a particular batch number. The counter 744 may store the actual number of item numbers generated for the particular batch number and stored in the database as with the batch information.

In one embodiment, an alternate value may also be combined with the series of identifiers before encryption of the code. In a preferred embodiment, a triple-DES encryption algorithm (e.g., having 168 bit key length) is applied by the encryption module 738 to the combination of the series of identifiers. In alternate embodiments, other encryption algorithms may be applied. Since the check value is a predetermined constant value, a check value extracted from the decrypted code is compared to the expected value to determine authenticity of the code during the authentication process. In one embodiment, the check value is chosen to have a combination of zero bits and one bits to increase security of the encryption. Alternative check values may also be used.

In one embodiment, the encryption module 738 uses an encryption key to perform the triple DES encryption and each encryption key can be identified by the key-ID and may be stored in the database 732. In alternate embodiments, code providers at customer sites may also have access to their own encryption key.

In one embodiment, a version indicator can be used to support future versions of the coding algorithm. In the current embodiment, the version indicator having a value of zero is used. The value of one can be reserved for future use with alternate versions of the coding algorithm. In one embodiment, the version indicator and the key-ID can be combined into a word and obscured through computing a Boolean logic or arithmetic function (e.g., exclusive OR, NOR, AND, etc.) of the word and a hash of the encrypted value of the series of identifiers (e.g., a combination of the batch number, item number, and check value). In one embodiment, the hash can be computed by applying the Boolean logic or arithmetic function (e.g., exclusive OR, NOR, AND, etc.) between subwords of the DES encrypted block by the hash module 740. One purpose of obscuring the key-ID and the version indicator allows codes to appear random.

The encrypted code is a combination of the obscured value of the key-ID and version indicator with the encrypted value of the series of identifiers. In one embodiment, the encrypted code can be divided into smaller blocks (e.g., nibbles) and each block can be converted into an alphanumeric character by the conversion module 746. For example, each block may be converted into one of the thirty-two alphanumeric characters based a mapping illustrated in Table 1 of FIG. 5. In the embodiment shown in FIG. 5, the characters include the ten digits and twenty-two of the twenty-six upper case ASCII letters. In this embodiment, the letters O, Q I, and B are omitted to prevent confusion with the number digits 0, 1, and 8.

When a request for code authentication is received from a client, the conversion module 746 may also reference Table 1 to convert the alphanumeric representation to the original binary representation. Furthermore, during the authentication process, the decryption module 742 may use the encryption key identified through the key-ID extracted from the encrypted code to decrypt the encrypted code such that the check value can be extracted and compared to the expected value. In one embodiment, the verification module 748 compares the extracted batch number, and check value to expected values to determine validity of the encrypted code. Additionally, the verification module 748 may also compare the item number with the actual number of codes generated for a particular batch. If the item number exceeds the total number of codes generated, then the code is determined invalid. In alternate embodiments, the check value may be a constant value used for one or more batches of codes.

It will be appreciated by one skilled in the art that the server module 100 illustrated in FIG. 2 has been provided as one example or embodiment of the disclosure, and is not meant to be limiting in nature. The module may include other logic and functional or modular components, the description of which has not been provided to avoid unnecessarily obscuring the invention.

Figure 7B:
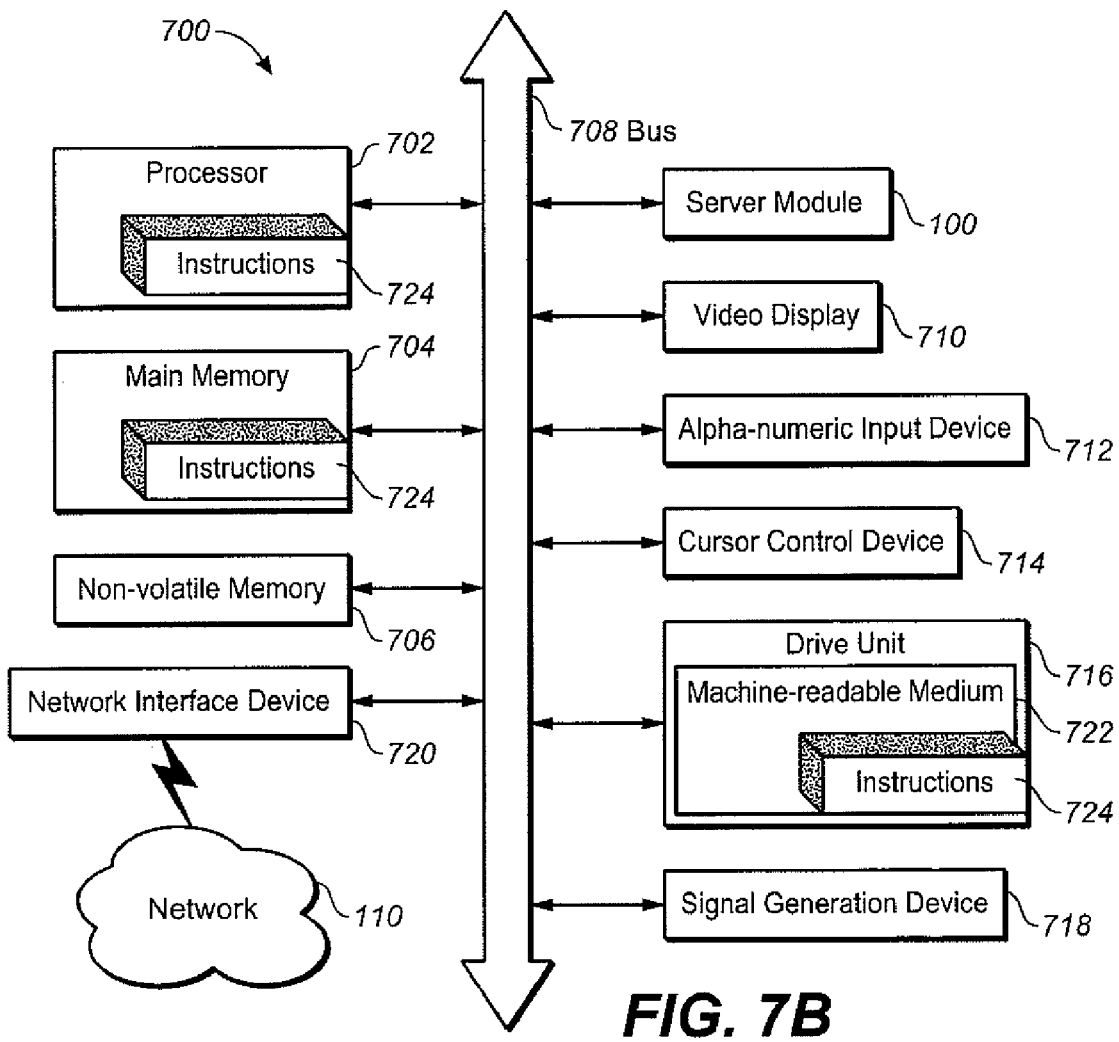
FIG. 7B illustrates a block diagram having sources for a set of instructions, according to one embodiment.

FIG. 7B shows a diagrammatic representation of a machine in the exemplary form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server (e.g., the server module 100) or a client 102 machine in a client-server network environment, or as a peer machine in a peer-to-peer (or distributed) network environment. In one embodiment, the machine communicates with the server module 100 to facilitate operations of the server module and/or to access the operations of the server module.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU) a graphics processing unit (GPU) or both), a main memory 704 and a nonvolatile memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720. The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media. The software 724 may further be transmitted or received over a network 726 via the network interface device 720.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Although embodiments have been described with reference to specific exemplary embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    receiving a request for a batch of codes, each code being unique for a separate unit item; and
    generating the batch of codes, using a processor, each code being unique for a separate unit item, wherein the generation of each code of the batch comprises
        generating a unique item number for the code being generated,
        generating a first string by appending a batch number and a check value to the unique item number,
        generating a second string including a key ID, the key ID being associated with an encryption key,
        generating an obscured string by obscuring the second string,
        generating an encrypted string by encrypting the first string using the encryption key, and
        generating the code by appending the obscured string to the encrypted string.

2. The method of claim 1 wherein generating the unique item number comprises incrementing a stored value representing a number of codes generated.

3. The method of claim 1 wherein generating the unique item number comprises determining the unique item number by adding an increment to a previously generated unique item number.

4. The method of claim 1 wherein obscuring the second string includes computing a hash of the encrypted string.

5. The method of claim 1 wherein generating the first string further includes appending an alternative value to the batch number, check value, and unique item number.

6. The method of claim 1 wherein the generation of each code of the batch further comprises converting the encrypted string into an alphanumeric representation.

7. The method of claim 1 further comprising
    receiving a code from the batch of codes,
    extracting the check value from the code, and
    comparing the check value to an expected check value.

8. The method of claim 7 wherein extracting the check value and comparing the check value to the expected check value comprises
    using a first encryption key to decrypt the encrypted string to extract a wrong check value,
    determining that the wrong check value does not match the expected check value, and
    using a second encryption key to decrypt the encrypted string to extract the check value.

9. The method of claim 7 wherein extracting the check value comprises
    extracting a key ID from the code,
    recovering the first string by decrypting the encrypted string using the key ID, and
    reading the check value from the first string.

10. The method of claim 9 wherein extracting the key ID from the code includes
    reading the obscured string from the code, and
    deobscuring the obscured string.

11. The method of claim 7 further comprising converting an alphanumeric representation of the code into a binary representation thereof.

12. A method comprising:
    receiving a code from a consumer device;
    reading an obscured string from the code;
    deobscuring the obscured string to reveal a first string including a key ID;
    using the key ID to select a decryption key;
    decrypting, using the decryption key, at least a portion of the code, with a processor, to reveal a second string including a check value, a unique item number, and a batch number appended together;
    reading the check value from the second string; and
    authenticating the code by verifying that the check value matches an expected check value.

13. The method of claim 12 further comprising sending an indication of authentication to the consumer device.

14. The method of claim 12 further comprising sending product information to the consumer device.

15. The method of claim 12 further comprising sending client information to the consumer device.

16. The method of claim 12 further comprising receiving location information from the consumer device.

* * * * *